(12) United States Patent
Mansour

(10) Patent No.: US 7,787,885 B1
(45) Date of Patent: Aug. 31, 2010

(54) WALSH CODE EXPANSION IN WIRELESS COMMUNICATIONS SYSTEMS

(75) Inventor: Nagi A. Mansour, Arlington, VA (US)

(73) Assignee: Nextel Communications Inc., Overland Park, KS (US)

( * ) Notice: Subject to any disclaimer, the term of this patent is extended or adjusted under 35 U.S.C. 154(b) by 780 days.

(21) Appl. No.: 11/501,942

(22) Filed: Aug. 10, 2006

(51) Int. Cl.
*H04W 72/00* (2009.01)

(52) U.S. Cl. ............ 455/452.2; 455/450; 455/464; 370/203; 370/208; 370/209; 370/335

(58) Field of Classification Search ............ 370/335, 370/203, 208, 209; 455/183.2, 450, 464, 455/542.2, 543
See application file for complete search history.

(56) References Cited

U.S. PATENT DOCUMENTS

| | | | |
|---|---|---|---|
| 5,450,453 A * | 9/1995 | Frank | 375/130 |
| 5,737,327 A * | 4/1998 | Ling et al. | 370/335 |
| 5,812,543 A * | 9/1998 | Sugita | 370/335 |
| 5,949,814 A | 9/1999 | Odenwalder et al. | |
| 6,115,410 A | 9/2000 | Naruse | |
| 6,173,077 B1 | 1/2001 | Odenwalder et al. | |
| 6,178,334 B1 * | 1/2001 | Shyy et al. | 455/503 |
| 6,285,655 B1 * | 9/2001 | Lundby et al. | 370/209 |
| 6,289,228 B1 | 9/2001 | Rotstein et al. | |
| 6,317,422 B1 | 11/2001 | Khaleghi et al. | |
| 6,366,778 B1 * | 4/2002 | Bender et al. | 455/442 |
| 6,381,235 B1 | 4/2002 | Kamel et al. | |
| 6,411,645 B1 | 6/2002 | Lee et al. | |
| 6,456,611 B1 * | 9/2002 | Hu et al. | 370/342 |
| 6,473,395 B1 | 10/2002 | Lee | |
| 6,477,157 B1 | 11/2002 | Kim et al. | |
| 6,504,832 B1 | 1/2003 | Koo et al. | |
| 6,570,909 B1 * | 5/2003 | Kansakoski et al. | 375/148 |
| 7,218,617 B1 * | 5/2007 | Usuda et al. | 370/320 |
| 2002/0009063 A1 * | 1/2002 | Odenwalder et al. | 370/335 |
| 2002/0031082 A1 * | 3/2002 | Lundby et al. | 370/209 |
| 2002/0186677 A1 * | 12/2002 | Leung | 370/342 |
| 2003/0108088 A1 * | 6/2003 | Odenwalder et al. | 375/146 |
| 2003/0114180 A1 * | 6/2003 | Black et al. | 455/522 |
| 2004/0091020 A1 * | 5/2004 | Ladyzhenskii | 375/146 |
| 2004/0136445 A1 * | 7/2004 | Olson et al. | 375/148 |
| 2004/0203813 A1 * | 10/2004 | Wei et al. | 455/450 |
| 2005/0063345 A1 * | 3/2005 | Wu et al. | 370/335 |
| 2006/0023774 A1 * | 2/2006 | Pan et al. | 375/148 |

* cited by examiner

*Primary Examiner*—Kamran Afshar
*Assistant Examiner*—Chuong A Ngo

(57) ABSTRACT

A system and method for expanding traffic channels in a wireless communications system, such as CDMA2000, includes a method for generating a forward link signal including encoding each of a first set of channels with a mutually corresponding channel code, such as a Walsh code, selected from a predetermined set of channel codes, and encoding each of a second set of channels with the same mutually corresponding channel codes. A scramble code is applied to the encoded second set of traffic channels, which is combined with the encoded first set of traffic channels to form an extended forward link signal. Each channel code corresponds to two forward link channels, which are selectively decoded using the scramble code.

25 Claims, 5 Drawing Sheets

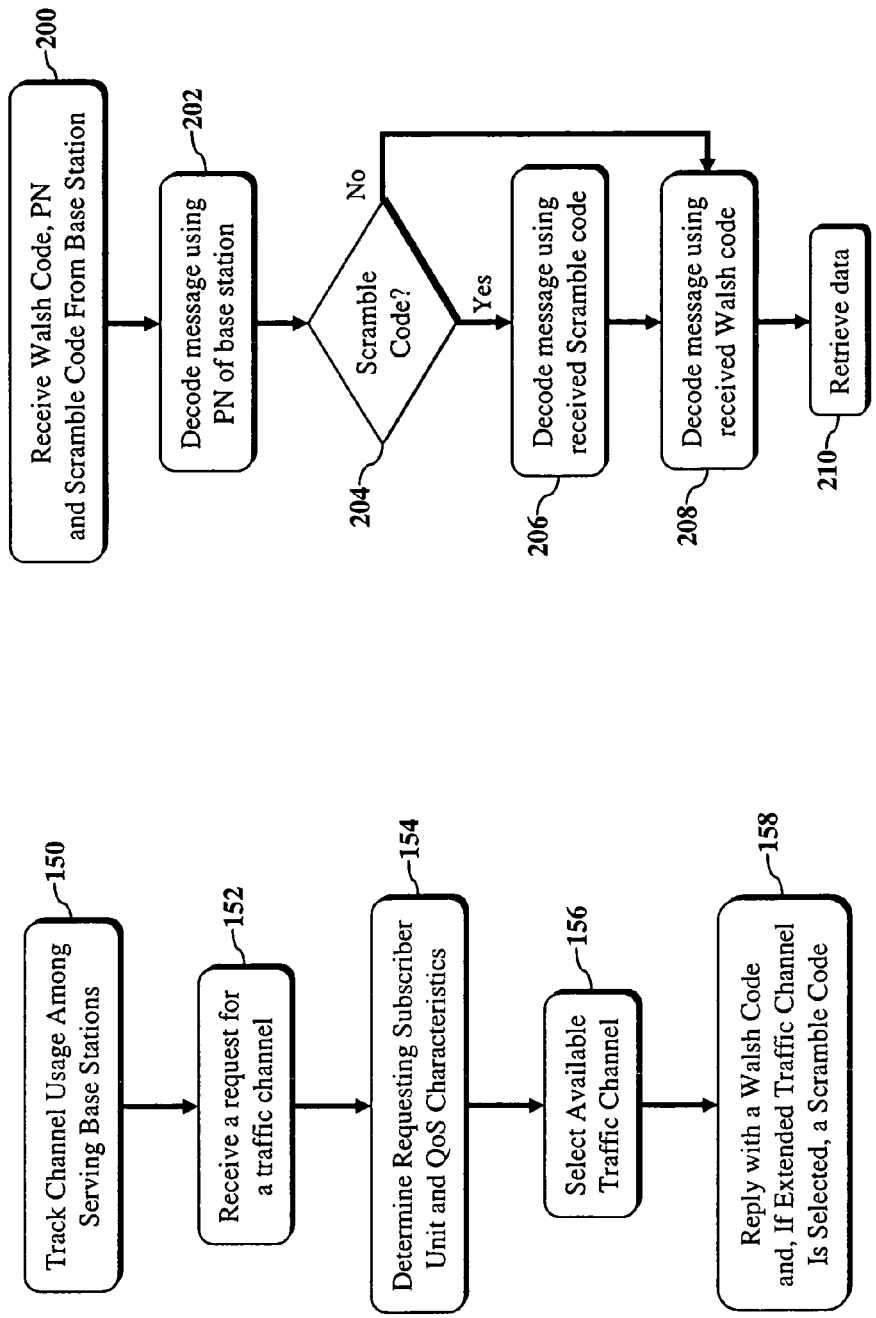

WALSH CODE EXPANSION IN WIRELESS COMMUNICATIONS SYSTEMS

FIELD OF THE INVENTION

The present invention relates generally to wireless communications systems and more particularly to systems and methods for expanding available communications channels in a wireless communications system.

BACKGROUND OF THE INVENTION

CDMA2000 (code division multiple access 2000) is a third-generation (3G) wireless communications standard that uses Code Division Multiple Access (CDMA) to facilitate wireless communications between CDMA base stations and mobile devices. Variants of CDMA2000 include CDMA2000 1x, which provides both voice and data services over a standard CDMA channel, and CDMA2000 Evolution Data-Optimized (1xEV-DO) which is optimized for High Data Rate (HDR) capability. Current versions of the CDMA2000 standards are published and approved by the Telecommunications Industry Association and the International Telecommunication Union.

In a CDMA2000 1x system, communications channels in a forward link signal transmitted by a base station are identified using Walsh codes. A voice user is assigned one of 64 unique Walsh codes, allowing the voice user to receive and decode data on a corresponding traffic channel. A pilot channel, a sync channel and a plurality of paging channels are also identified using Walsh codes, which reduces the number of Walsh codes available for voice communications. In a system implementing the CDMA2000 1x data mode, each user is similarly assigned a unique Walsh code for each assigned channel which may include a fundamental channel (FCH) or a dedicated control channel (DCCH) for data rates up to 9.6 kpbs. If the user's date rate is greater than 9.6 kbps, then the user is further assigned a second Walsh code associated with a supplemental channel.

As all IP mobile networks become more popular, the number of mobile users attempting wireless packet communications could exceed the system capacity which is limited by the 64 Walsh codes that are typically available. Further, during operation, packet data users assigned Walsh codes may be in a control/hold state during short idle periods between packet bursts. These Walsh codes are not available for use by other users during these periods of inactivity.

The 64 Walsh codes used in CDMA2000 systems are mutually orthogonal and were selected to avoid unwanted interference between traffic channel signals transmitted from the same base station. Thus, there are practical limitations associated with adding more Walsh codes. In view of the above, there is a need for an improved system and method for utilizing Walsh codes in wireless communications systems.

SUMMARY OF THE INVENTION

The present invention is a system and method for expanding traffic channels in a wireless communications system, such as CDMA2000. In one aspect of the present invention, a wireless communications system includes a base station and a subscriber unit. A method for generating a forward link signal includes encoding each of a first set of communications channels with a unique channel code, such as a Walsh code, selected from a predetermined set of codes, and encoding each of a second set of communications channels with the same set of channel codes. A scramble code is applied to the encoded second set of traffic channels, which is combined with the encoded first set of traffic channels to form an extended forward link signal. A pilot channel, sync channel and paging channel may also be coded into the first set of traffic channels. A pseudorandom number is applied to the extended forward link signal to identify the transmitting base station.

In another aspect of the present invention, a wireless base station includes means for encoding each of a first set of communications channels with a unique channel code selected from a predetermined set of channel codes, and means for encoding each of a second set of traffic channels with distinct ones of the unique channel codes. A means for applying a scramble code to the encoded second set of traffic channels and means for combining the encoded first set of traffic channels with the encoded and scrambled second set of traffic channels produce an extended forward link signal.

In a wireless communications system, a method for decoding a forward link signal includes receiving an identifier of a selected traffic channel, the identifier including a pseudorandom number associated with a transmitting base station, a channel code, such as a Walsh code, associated with a forward link channel in each of a first and second set of communications channels, and a scramble code if the selected traffic channel is in the second set of communications channels. A signal broadcast by the base station is received and decoded using the pseudorandom number. If the selected traffic channel is in the second set of communications channels, the signal is further decoded using the scramble code, which scrambles the first set of traffic channels as a result. The channel code is applied to isolate the selected traffic channel.

A more complete understanding of the present invention will be afforded to those skilled in the art, as well as a realization of additional advantages and objects thereof, by a consideration of the following detailed description. Reference will be made to the appended sheets of drawings, which will first be described briefly.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 4 is a flow diagram illustrating an embodiment of a channel selection logic;

FIG. 5 is a flow diagram illustrating an operation of a subscriber unit in accordance with an embodiment of the present invention.

DETAILED DESCRIPTION OF PREFERRED EMBODIMENTS

Figure 1:
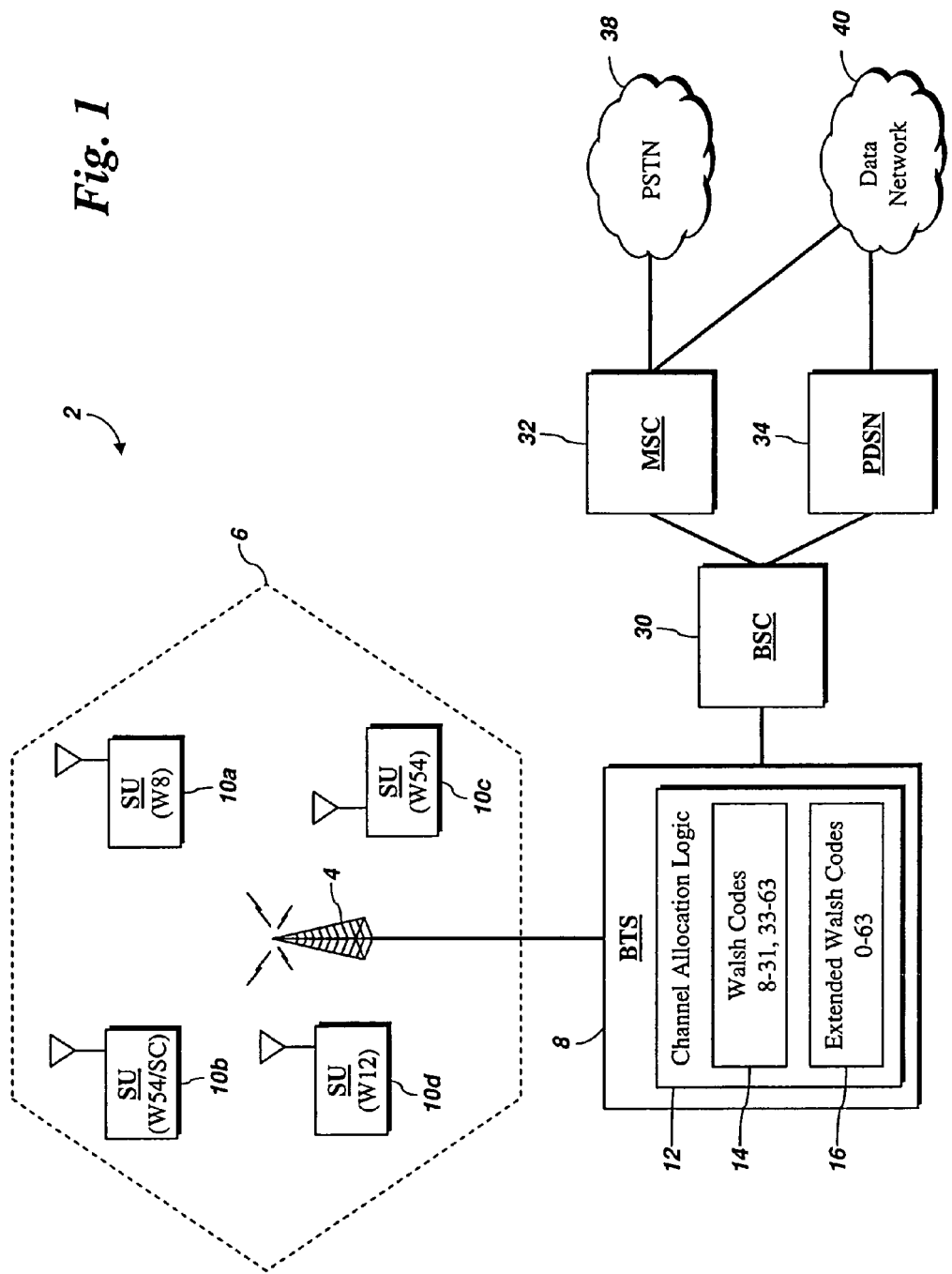
FIG. 1 is a wireless communications system in accordance with an embodiment of the present invention.

An exemplary embodiment of the present invention will now be described with reference to FIG. 1. A wireless communications system 2 is shown as a cell-based communication system including at least one base transceiver system (BTS) 8 including an antenna 4 providing wireless communications services to a plurality of subscriber units 10*a-d*, in a geographical coverage area 6. In operation, each subscriber unit 10*a-d* positioned within the cell 6 communicates with the local antenna 4 by exchanging data packets according to a multiple-access wireless communication standard, such as code division multiple access 2000 (CDMA2000). The wireless communications system 2 facilitates at least one mode of communication such as interconnect, push-to-talk (PTT), email, short messaging service (SMS), multimedia messaging service (MMS) and packet data communications. Each subscriber unit 10*a-d* is a device adapted for communication with the antenna 4, and may include mobile phones, pagers, personal digital assistants (PDAs), Personal Computer Memory Card International Association (PCMCIA) cards, portable computers and other wireless communications devices.

The BTS 8 is connected to a base station controller (BSC) 30, which is interfaced with a mobile switching center (MSC) 32 and a packet data serving node 34. The mobile switching center (MSC) 32 manages the wireless communications in the cell 6, including call set-up, routing calls between the subscriber units 10*a-d* and routing calls between the subscriber units 10*a-d* and at least one communications network, such as a public switched telephone network 38 (PTSN) or a data network 40 such as the Internet. The PDSN 34 facilitates wireless data communications between the subscriber units 10*a-d* and the data network 40. It will be appreciated by those skilled in the art that the wireless communications system 2 of the exemplary embodiment may include other system components, including a plurality of BTSs, BSCs and MSCs, and may operate using other protocols and modes of communication, consistent with the teachings of the present invention.

In the exemplary embodiment, the BTS 8 includes Channel Allocation Logic 12 for managing communications resources including allocating traffic channels to the subscriber units 10*a-d* that request communications resources from the BTS 8. The Channel Allocation Logic 12 manages at least 128 communications channels including 64 unique Walsh Codes 14 and 64 extended Walsh Codes 16.

Figure 2:
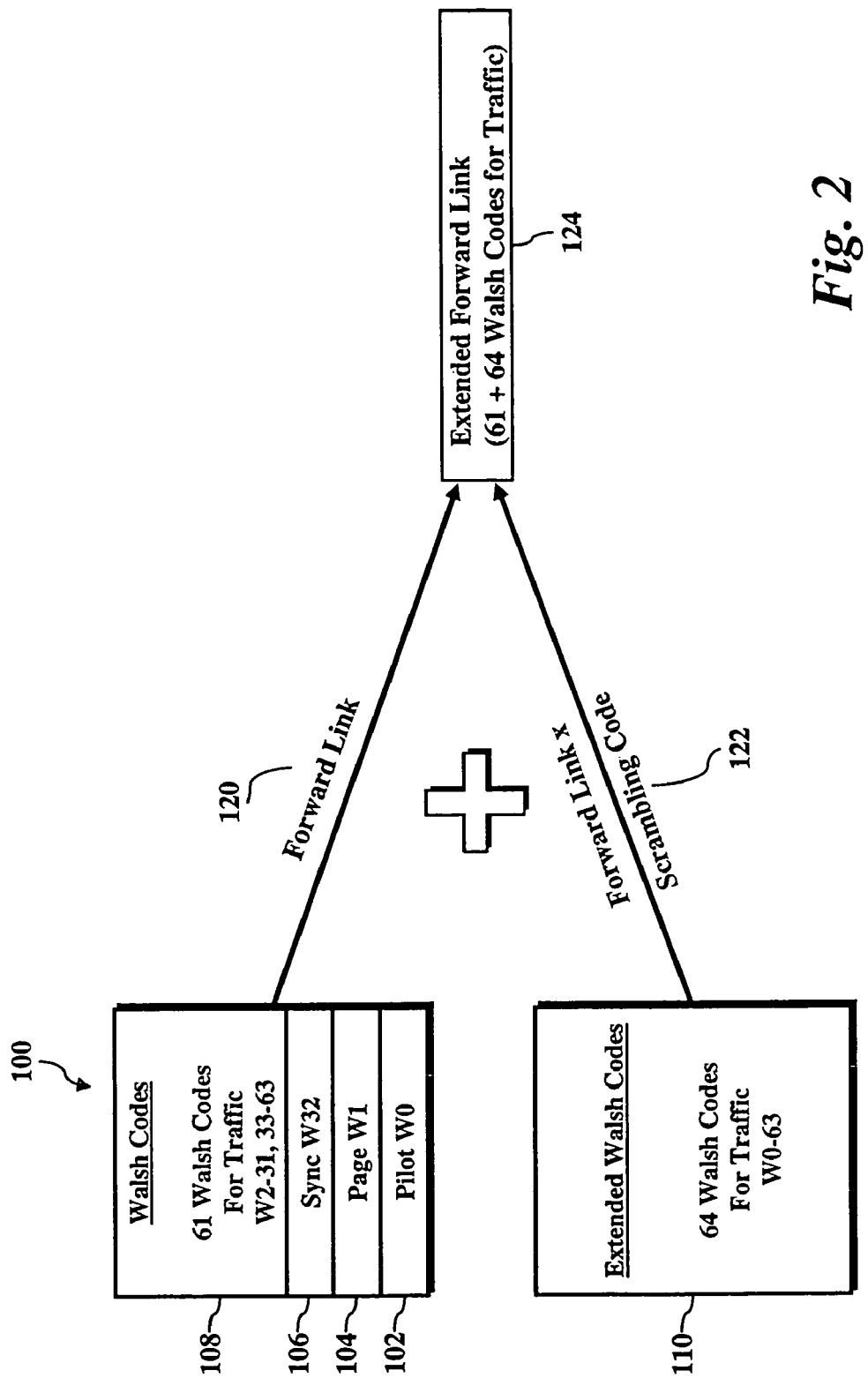
FIG. 2 illustrates an embodiment of an extended forward link structure.

Referring to FIG. 2, an embodiment of a forward link structure implementing extended Walsh Codes is illustrated. The forward link channel structure includes a plurality of channels 100 each coded with one of 64 Walsh Codes. The channels include a pilot channel 102, a paging channel 104, a sync channel 106 and sixty-one traffic channels 108. The coded channels are combined on a forward link channel 120. An additional sixty-four traffic channels 110 are each coded with one of the 64 Walsh Codes. The extended traffic channels 110 are combined on a forward link channel and coded with a scrambling code 122, such as a predefined pseudorandom number. The 128 channels are then combined to form an extended forward link channel 124 which includes 125 traffic channels in the exemplary embodiment.

Figure 3:
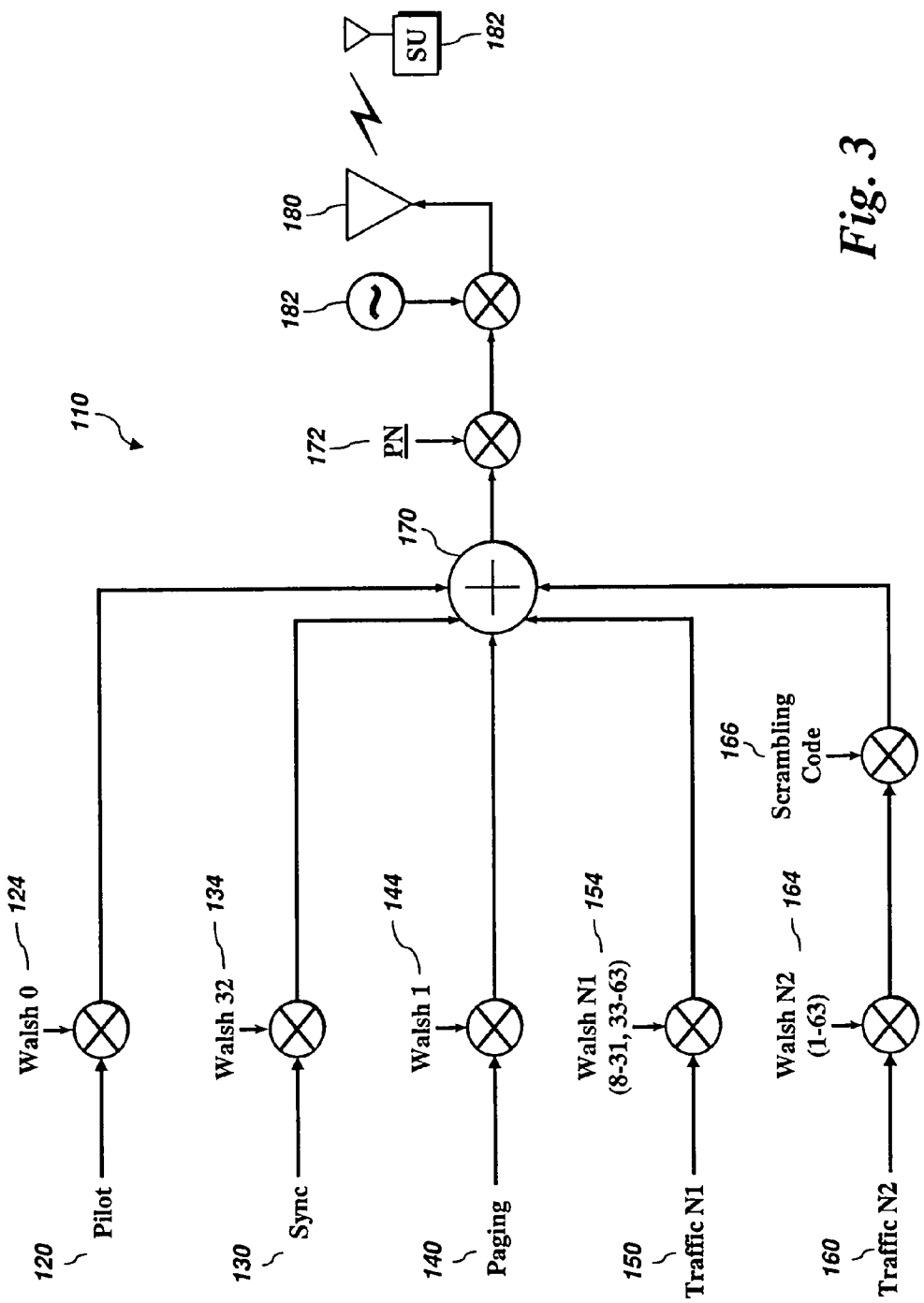
FIG. 3 is a logical circuit diagram illustrating a base station in accordance with an embodiment of the present invention.

Referring to FIG. 3, an embodiment of circuitry 110 for encoding extended traffic channels is logically illustrated. A pilot channel 120 is encoded with a first Walsh code 124, a sync channel 130 is coded with a second Walsh code 134, and a paging channel 140 is coded with a third Walsh code 144. A plurality of traffic channels N1 150 are each coded by unique Walsh codes 154. A second plurality of traffic channels N2 are each coded by Walsh codes 164 which are subsequently coded with a scrambling code 166. All of the codes are combined at 170 and subsequently coded by a pseudorandom number (PN) code 172 identifying the transmitted base station. A modulation signal 182 is applied before transmission through an antenna 180 for reception by a subscriber unit 182.

Referring to FIG. 4, in one embodiment of the Channel Allocation Logic, the BTS tracks channel usage among neighboring base stations in step 150. A base station receives a request for a traffic channel in step 152 and, in step 154, determines whether the requesting subscriber unit is capable of decoding Extended Walsh codes and verifies the quality of service (QoS) characteristics of the subscriber. An available traffic channel is selected in step 156 based on the availability of a traffic channel on the transmitting base station, availability of the traffic channel on neighboring base stations, the ability of the subscriber unit to decode extended traffic channels, and the subscriber's QoS characteristics. In one embodiment, extended traffic channels are allocated to mobile subscribers having subscriber units compatible with the extended Walsh code implementation of the present embodiment. The extended traffic channels, which are coded with the scramble code, will appear as noise to traditional subscriber units allowing backward compatibility. In step 158, the Walsh Code associated with the selected traffic channel is returned to the requesting subscriber unit, along with a scramble code if the selected traffic channel is an extended traffic channel.

Figure 6:
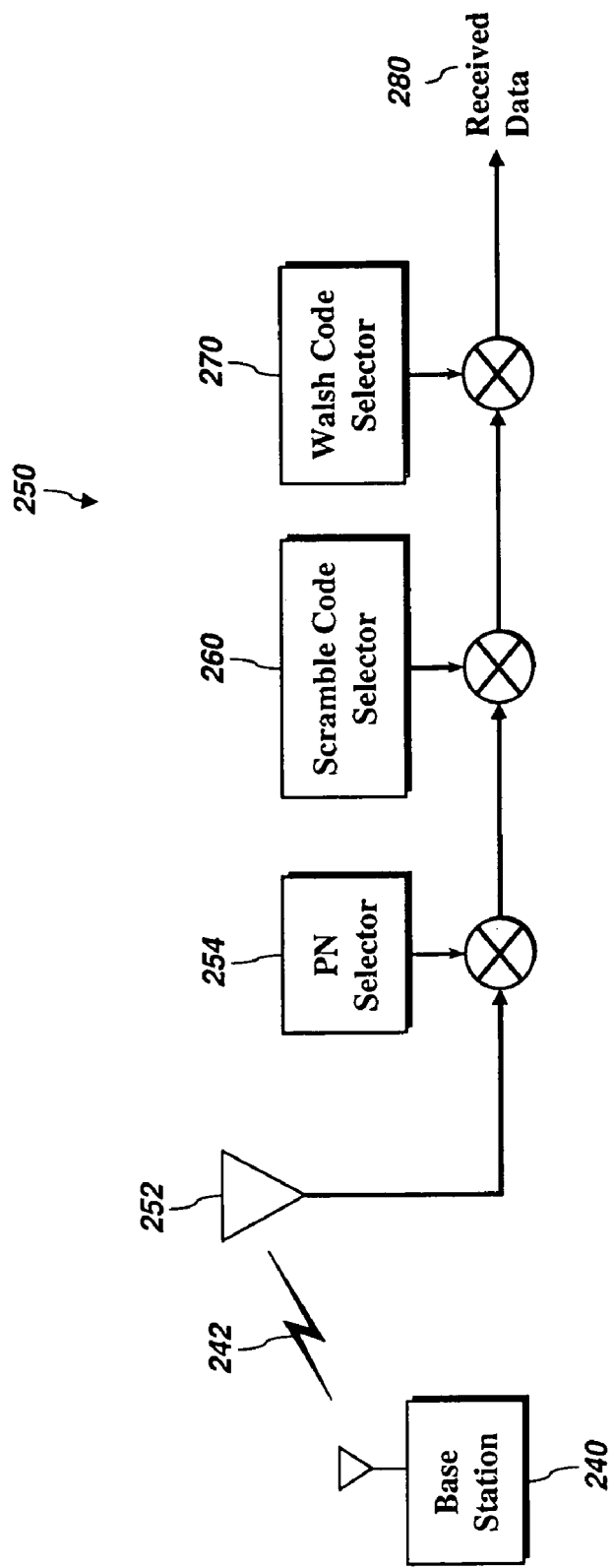
FIG. 6 is a logical circuit diagram illustrating a subscriber unit in accordance with an embodiment of the present invention.

Referring to FIGS. 5 and 6, an embodiment of subscriber unit logic and circuitry for receiving an extended forward link signal from the base station is illustrated. In step 200, the subscriber unit receives the Walsh code, the base station's PN offset and, if used, the scramble code from the base station for use in acquiring the traffic channel assigned to the subscriber unit. In step 202, the subscriber unit decodes the forward link message using the PN offset of the base station. For each of the traffic channels assigned to the subscriber unit, if the traffic channel has a scramble code (step 204) then the forward link is decoded using the received scramble code in step 206. Next, in step 208, the received forward link message is decoded using the received Walsh code for the assigned traffic channel. If a scramble code is used, the extended forward link signals will be unscrambled, and the original unscrambled forward link signals will be scrambled, allowing the extended traffic channel to be decoded using the Wash code. The data is then extracted in step 210.

Referring to FIG. 6, a base station 240 transmits an extended forward link signal 242 which is received at an antenna 252 of the subscriber unit 250. A PN selector 254 is set to the base station 240's PN and applied to the incoming signal to isolate the signals transmitted by the base station 240. A scramble code selector 260 is set to the scramble code received by the base station and applied to the signal to unscramble the received signal if an extended traffic channel is used. If no scramble code has been assigned, then the signal passes through without modification. The Walsh Code selector 270 is set to the received Walsh code for the assigned traffic channel and applied to the signal to isolate the traffic channel data 280. It will be appreciated by those skilled in the art that the logical circuitry illustrated in FIG. 6 is exemplary and that other subscriber unit configurations may be used consistent with the present embodiment. For example, in one embodiment, the subscriber unit 250 may include separate logic and circuitry for receiving and decoding the pilot channel, sync channel and paging channels.

Having thus described various embodiments of the present invention, it should be apparent to those skilled in the art that certain advantages of the within described system have been achieved. It should also be appreciated that various modifications, adaptations, and alternative embodiments thereof may be made within the scope and spirit of the present invention.

What is claimed is:

1. In a wireless communications system, a method for generating a forward link signal comprising:
   encoding each of a first set of traffic channels with one of sixty four Walsh Codes to form a forward link channel;
   encoding each of a second set of traffic channels with one of the sixty four Walsh Codes to form extended traffic channels;
   applying a scramble code to the extended traffic channels; and
   combining the forward link channel and the extended traffic channels to form an extended forward link channel.

2. The method of claim 1 further comprising:
   encoding a pilot channel with one of the sixty four Walsh Codes; and
   combining the encoded pilot channel with the first set of traffic channels.

3. The method of claim 1 further comprising:
   encoding a sync channel with one of the sixty four Walsh Codes; and
   combining the encoded sync channel with the first set of traffic channels.

4. The method of claim 1 further comprising:
   encoding a paging channel with one of the sixty four Walsh Codes; and
   combining the encoded paging channel with the first set of traffic channels.

5. The method of claim 1 wherein the step of applying a scramble code further comprises combining the encoded second set of traffic channels prior to applying the scramble code.

6. The method of claim 1 further comprising applying a pseudorandom number to the extended forward link channel, wherein the pseudorandom number identifies a transmitting base station.

7. The method of claim 1, further comprising:
   receiving a request for a traffic channel from a subscriber unit; and
   determining if the requesting subscriber unit is capable of decoding said scrambled extended traffic channels.

8. The method of claim 7, further comprising selecting an available one of the extended traffic channels based at least in part on whether the requesting subscriber unit is capable of decoding the scrambled extended traffic channels.

9. The method of claim 8, further comprising returning, to the requesting subscriber unit, the scramble code and one of the predetermined set of codes corresponding to the selected one of the extended traffic channels.

10. The method of claim 7, further comprising selecting an available one of the first set of traffic channels if the requesting subscriber unit is not capable of decoding the scrambled extended traffic channels.

11. In a wireless communications system, a base station comprising:
   means for encoding each of a first set of traffic channels with one of sixty four Walsh Codes to form a forward link channel;
   means for encoding each of a second set of traffic channels with one of the sixty four Walsh Codes to form extended traffic channels;
   means for applying a scramble code to the extended traffic channels; and
   means for combining the forward link channel and the extended traffic channels to form an extended forward link channel.

12. The base station of claim 11 further comprising means for encoding a pilot channel with a unique one of the sixty four Walsh Codes, wherein the encoded pilot channel is combined with the first set of traffic channels.

13. The base station of claim 11 further comprising means for encoding a sync channel with a unique one of the sixty four Walsh Codes, wherein the encoded sync channel is combined with the first set of traffic channels.

14. The base station of claim 11 further comprising means for encoding a paging channel with a unique one of the sixty four Walsh Codes, wherein the encoded paging channel is combined with the first set of traffic channels.

15. The base station of claim 11 wherein the encoded second set of traffic channels are combined prior to applying the scramble code.

16. The base station of claim 11 wherein a pseudorandom number identifying a transmitting base station is applied to the extended traffic channels.

17. The base station of claim 11, further comprising:
   means for receiving a request for a traffic channel from a subscriber unit; and
   means for determining if the requesting subscriber unit is capable of decoding said scrambled extended traffic channels.

18. The base station of claim 17, further comprising means for selecting an available one of the extended traffic channels based at least in part on whether the requesting subscriber unit is capable of decoding the scrambled extended traffic channels.

19. The base station of claim 18, further comprising means for returning, to the requesting subscriber unit, the scramble code and one of the predetermined set of codes corresponding to the selected one of the extended traffic channels.

20. The base station of claim 17, further comprising means for selecting an available one of the first set of traffic channels if the requesting subscriber unit is not capable of decoding the scrambled extended traffic channels.

21. In a wireless communications system, a method for decoding a forward link signal comprising:
   receiving an identifier of a selected traffic channel, the identifier including a pseudorandom number associated with a transmitting base station, a channel code associated with a forward link channel in each of a first and second set of traffic channels, and a scramble code if the selected traffic channel is in the second set of traffic channels;
   receiving a signal broadcast by the base station;
   decoding the received signal using the pseudorandom number;
   if the selected traffic channel is in the second set of traffic channels, further decoding the signal using the scramble code, whereby the first set of traffic channels is scrambled; and
   applying the channel code to isolate the selected traffic channel.

22. The method of claim 21 wherein the channel code is a Walsh Code.

23. The method of claim 22 further comprising decoding a pilot channel with a predetermined Walsh Code before the step of applying the scramble code.

24. The method of claim 22 further comprising decoding a sync channel with a predetermined Walsh Code before the step of applying the scramble code.

25. The method of claim 22 further comprising decoding a paging channel with a predetermined Walsh Code and extracting the identifier of the selected traffic channel.

* * * * *